(12) United States Patent  
King

(10) Patent No.: US 12,528,406 B1
(45) Date of Patent: Jan. 20, 2026

(54) CUSTOMIZABLE EXTERNAL VEHICLE COMMUNICATION SYSTEM

(71) Applicant: Donovan Joseph King, Miami, FL (US)

(72) Inventor: Donovan Joseph King, Miami, FL (US)

( * ) Notice: Subject to any disclaimer, the term of this patent is extended or adjusted under 35 U.S.C. 154(b) by 0 days.

(21) Appl. No.: 18/829,397

(22) Filed: Sep. 10, 2024

(51) Int. Cl.
*G08B 21/00* (2006.01)
*B60Q 5/00* (2006.01)

(52) U.S. Cl.
CPC .................................. *B60Q 5/003* (2013.01)

(58) Field of Classification Search
CPC ....... G10L 13/08; G10L 15/26; G10L 13/047; G10L 13/06; G10L 13/07; G10L 13/00; G10L 13/04; G10L 15/22; G10L 25/63; G10L 15/00; G10L 17/00; G10L 19/00; G10L 21/00; G10L 25/00; G10L 99/00; G10L 25/48; G08G 1/205; G08G 1/00; G08G 3/00; G08G 5/00; G08G 9/00; G08G 99/00; G08G 7/00; G08G 1/0965; G08G 1/162; G08G 1/166; H04M 2203/2027; H04M 3/42042; H04M 3/42059; H04M 3/527; H04M 11/06; H04M 1/57; H04M 1/72415; H04M 1/00; H04M 3/00; H04M 5/00; H04M 7/00; H04M 9/00; H04M 11/00; H04M 13/00; H04M 15/00; H04M 17/00; H04M 19/00; H04M 99/00; H04M 2201/00; H04M 2203/00; H04M 2207/00; H04M 2215/00; H04M 2242/00; H04M 2250/00; G06F 3/165; G06F 3/167; G06F 40/242; G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 2101/00; G06F 40/00; G06F 2111/00;

(Continued)

(56) References Cited

U.S. PATENT DOCUMENTS

D276,599 S    12/1984  Segan
10,005,388 B1 *  6/2018  Kim ........................ B60Q 5/00

(Continued)

FOREIGN PATENT DOCUMENTS

WO    2022128595    6/2022

*Primary Examiner* — Daniel Previl
(74) *Attorney, Agent, or Firm* — Kyle A. Fletcher, Esq.

(57) ABSTRACT

The customizable external vehicle communication system includes an electronics module, a sound transducer, and a playback activation control. Responsive to depressing the playback activation control located within a vehicle, the customizable external vehicle communication system may communicate an audible message to pedestrians and/or motorists who may be in proximity to the vehicle. The audible message may be delivered external to the vehicle via the sound transducer. The audible message may be customized and may result from the conversion of a digital message from text to speech. The digital message may be one of several messages stored in one or more memory modules within the electronics module. The digital messages may be created by typing the digital message into the customizable external vehicle communication system or by converting a user's speech from speech to text.

18 Claims, 7 Drawing Sheets

(58) Field of Classification Search
CPC ............. G06F 2113/00; G06F 2119/00; G06F 2117/00; G06F 2115/00; G06F 2123/00; G06F 2200/00; G06F 2201/00; G06F 2203/00; G06F 2205/00; G06F 2206/00; G06F 2207/00; G06F 2209/00; G06F 2211/00; G06F 2212/00; G06F 2213/00; G06F 2216/00; G06F 2219/00; G06F 2221/00; G06F 2218/00; G06F 3/0483; G06F 3/04847; G06F 3/0485; G06F 3/04855; G07C 5/008; G07C 1/00; G07C 3/00; G07C 5/00; G07C 7/00; G07C 9/00; G07C 11/00; G07C 13/00; G07C 15/00; G07C 2205/00; G07C 2209/00; G07C 5/0833; G07C 5/0825; G07C 5/0866; G07C 2009/0019; G07C 2009/00865; G07C 2209/04; G07C 2209/63; G07C 9/00309; G07C 9/00571; G07C 9/00896; H04L 27/02; H04L 67/12; H04L 67/125; H04L 67/56; H04L 67/568; H04L 63/0876; H04L 63/102; H04L 1/00; H04L 5/00; H04L 7/00; H04L 9/00; H04L 12/00; H04L 13/00; H04L 15/00; H04L 17/00; H04L 19/00; H04L 21/00; H04L 23/00; H04L 25/00; H04L 27/00; H04L 41/00; H04L 43/00; H04L 51/066; H04L 51/214; H04W 76/15; H04W 4/02; H04W 4/80; H04W 4/14; H04W 4/18; B60R 2325/101; B60R 2325/205; B60R 25/257; B60R 16/03; B60R 2011/0075; B60R 25/209; B60R 25/22; B60R 25/24; B60R 7/04; B60R 7/087; B60R 16/037; B60R 2022/4816; B60R 22/48; B60R 1/00; B60R 3/00; B60R 5/00; B60R 7/00; B60R 9/00; B60R 11/00; B60R 13/00; B60R 15/00; B60R 16/00; B60R 17/00; B60R 19/00; B60R 21/00; B60R 22/00; B60R 99/00; B60R 25/00; B60R 2225/00; B60R 2300/00; B60R 2325/00; G04G 21/025; G04G 21/04; G04G 21/06; G06K 19/07762; G06K 7/10297; G06K 7/10366; G06K 7/10425; G06Q 10/02; G06Q 10/08; G06Q 10/083; G06Q 10/0832; G06Q 10/0833; G06Q 20/14; G06Q 20/18; G06Q 20/204; G06Q 20/32; G06Q 20/327; G06Q 20/3278; G06Q 20/363; G06Q 20/405; G06Q 10/00; G06Q 10/04; G06Q 10/08355; G06Q 50/40; G06Q 50/47; G07B 17/00193; G07B 17/00314; G07B 2017/00225; G07B 2017/00322; G07F 17/0014; G07F 17/10; G07F 17/13; G07F 9/0235; G07G 1/009; G07G 1/00; G07G 3/00; G07G 5/00; B60Q 5/00; B60Q 5/005; B60Q 5/006; B60Q 9/008; B60Q 1/0058; B60Q 1/2607; B60Q 1/448; B60Q 1/543; B60Q 2400/40; B60Q 2900/30; B60Q 2900/50; B60Q 1/00; B60Q 3/00; B60Q 7/00; B60Q 9/00; B60Q 11/00; B60Q 2200/00; B60Q 2300/00; B60Q 2400/00; B60Q 2500/00; B60Q 2800/00; B60Q 2900/00; G08B 21/18; G08B 3/10; G08B 25/016; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 25/00; G08B 26/00; G08B 27/00; G08B 29/00; G08B 31/00; G10K 15/00; G10K 1/00; G10K 3/00; G10K 5/00; G10K 7/00; G10K 9/00; G10K 11/00; G10K 13/00; G10K 2200/00; G10K 2210/00; B60K 2325/00; B60K 35/10; B60K 35/22; B60K 28/08; B60K 35/29; B60K 2360/113; B60K 35/60; B60K 2360/119; B60K 2360/122; B60K 2360/1438; B60K 2360/151; B60K 2360/186; B60K 2360/1868; B60K 2360/188; B60K 2360/195; B60K 2360/197; B60K 2360/797; B60K 35/20; B60K 35/21; B60K 35/26; B60K 35/28; B60K 35/81; B60K 2360/115; B60K 2360/143; B60K 2360/782; B60K 38/20; E05B 83/32; F21S 41/285; F21S 43/14; F21S 43/15; F21S 43/19; F21S 43/195; F21S 43/26; B60B 11/10; B60B 19/00; B60B 2900/711; B60B 2900/731; B60L 53/126; B60L 53/32; B60W 2540/24; B60W 50/0098; B60Y 2400/11; B60Y 2400/30; G08C 17/02; G08C 13/00; G08C 15/00; G08C 17/00; G08C 19/00; G08C 21/00; G08C 23/00; G08C 25/00; G08C 2200/00; G08C 2201/00; Y02T 10/70; Y02T 10/7072; Y02T 90/12; Y02T 90/14; Y02T 10/00; Y02T 30/00; Y02T 50/00; Y02T 70/00; Y02T 90/00
USPC .............. 340/425.5, 905, 463, 426.2, 426.21, 340/426.19, 426.26, 438–439, 472, 488, 340/534

See application file for complete search history.

(56) References Cited

U.S. PATENT DOCUMENTS

| | | | |
|---|---|---|---|
| 2004/0078203 A1* | 4/2004 | Peter | G11C 7/16 704/275 |
| 2005/0096020 A1* | 5/2005 | Oesterling | G07C 5/008 455/414.2 |
| 2008/0140702 A1* | 6/2008 | Reed | G06F 16/48 707/999.102 |
| 2012/0299748 A1* | 11/2012 | Reid | B60Q 5/003 340/902 |
| 2017/0361770 A1* | 12/2017 | Larsen | B60Q 5/003 |
| 2018/0268807 A1* | 9/2018 | Agiomyrgiannakis | G10L 13/047 |
| 2022/0396204 A1 | 12/2022 | Sim | |
| 2024/0034230 A1 | 2/2024 | Haelvoet | |
| 2024/0094978 A1 | 3/2024 | Kim | |

* cited by examiner

CUSTOMIZABLE EXTERNAL VEHICLE COMMUNICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of vehicular safety and annunciators, more specifically, a customizable external vehicle communication system.

SUMMARY OF INVENTION

The customizable external vehicle communication system may comprise an electronics module, a sound transducer, and a playback activation control. Responsive to depressing the playback activation control located within a vehicle, the customizable external vehicle communication system may communicate an audible message to pedestrians and/or motorists who may be in proximity to the vehicle. The audible message may be delivered external to the vehicle via the sound transducer. The audible message may be customized and may result from the conversion of a digital message from text to speech. The digital message may be one of several messages stored in one or more memory modules within the electronics module. The digital messages may be created by typing the digital message into the customizable external vehicle communication system or by converting a user's speech from speech to text.

An object of the invention is to communicate an audible message to pedestrians and/or motorists how may be in proximity to a vehicle.

Another object of the invention is to provide a microphone and a speech to text converter to convert the user's speech to a digital message and a text to speech converter and a sound transducer to convert the digital message back into an audible message.

A further object of the invention is to provide one or more memory modules to store the digital messages and a microcontroller to control operation of the invention.

Yet another object of the invention is to provide a plurality of operator controls and one or more optical displays to control and monitor the operation of the invention.

These together with additional objects, features and advantages of the customizable external vehicle communication system will be readily apparent to those of ordinary skill in the art upon reading the following detailed description of the presently preferred, but nonetheless illustrative, embodiments when taken in conjunction with the accompanying drawings.

In this respect, before explaining the current embodiments of the customizable external vehicle communication system in detail, it is to be understood that the customizable external vehicle communication system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the customizable external vehicle communication system.

It is therefore important that the claims be regarded as including such equivalent construction insofar as they do not depart from the spirit and scope of the customizable external vehicle communication system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
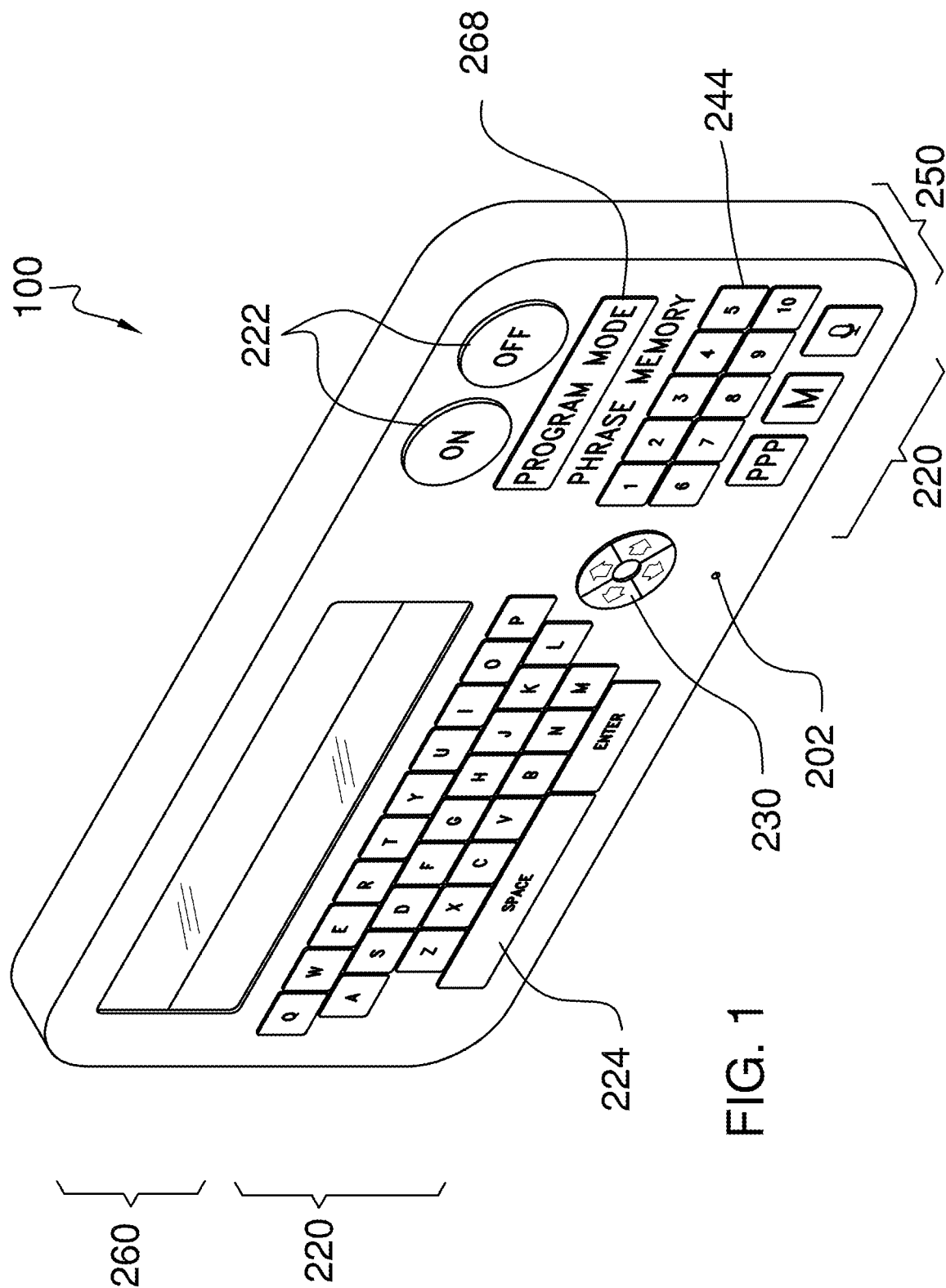
FIG. 1 is an isometric view of an embodiment of the disclosure.
Figure 2:
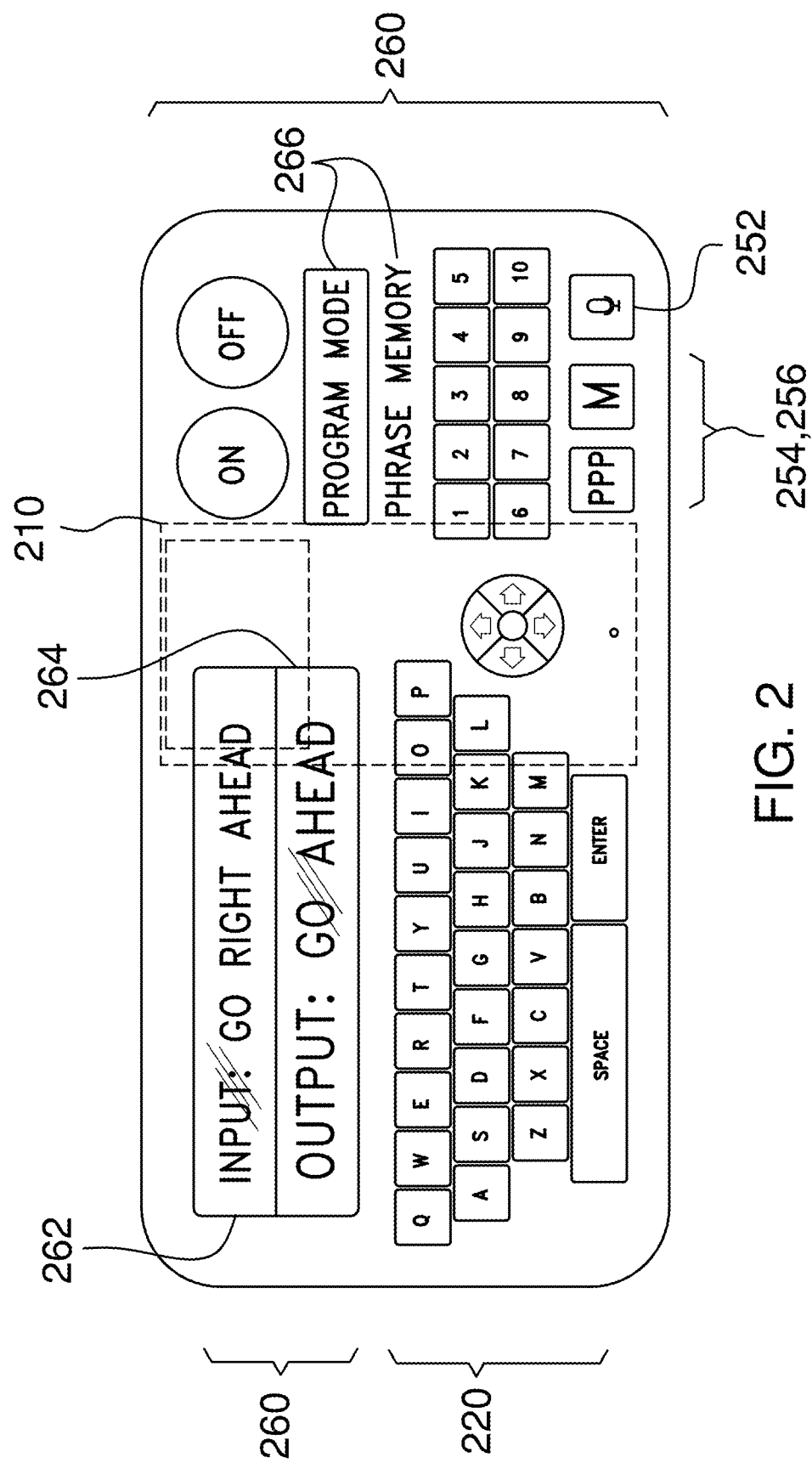
FIG. 2 is a detail view of an embodiment of the disclosure.
Figure 3:
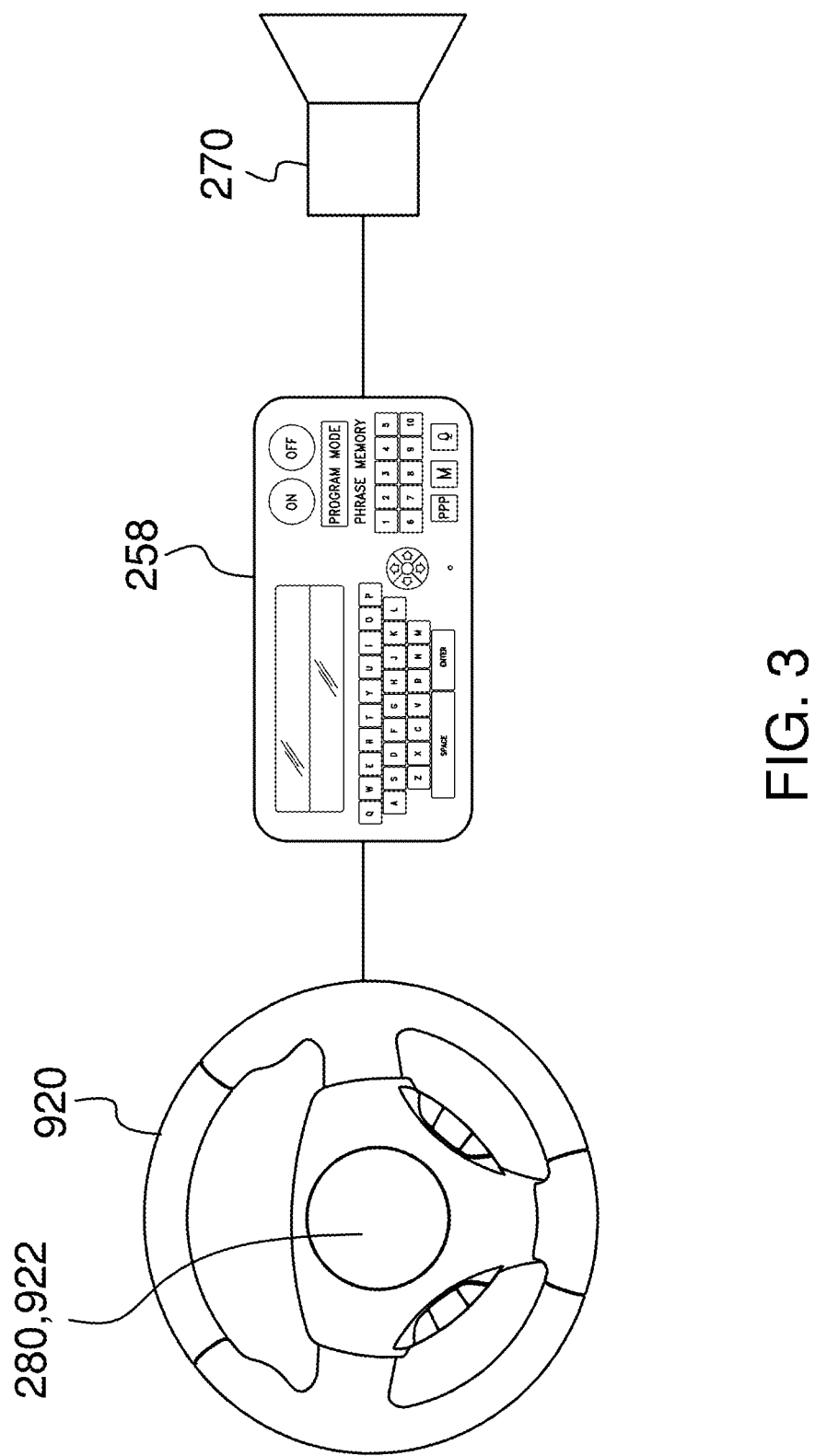
FIG. 3 is a front view of an embodiment of the disclosure, illustrating an after-market add-on embodiment.
Figure 4:
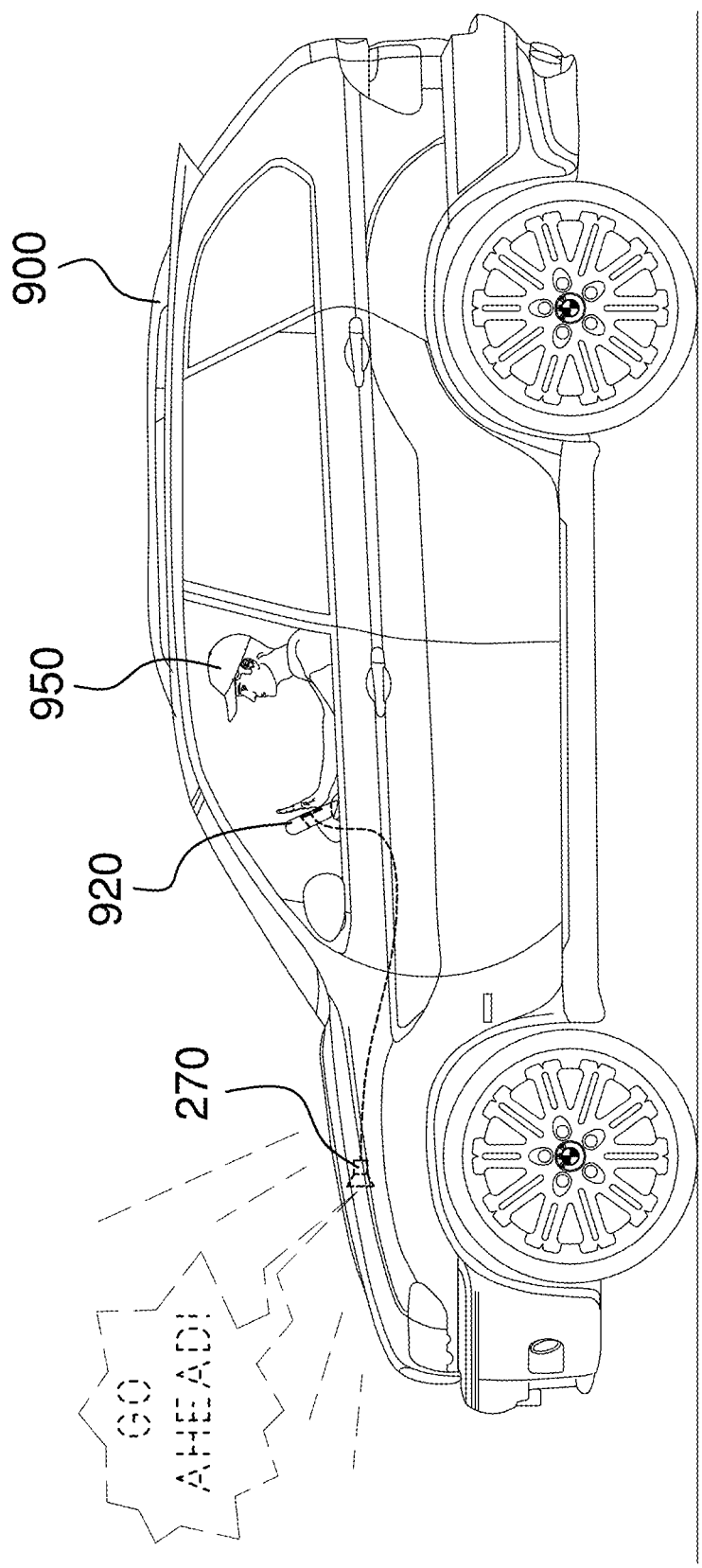
FIG. 4 is an in-use view of an embodiment of the disclosure.
Figure 5:
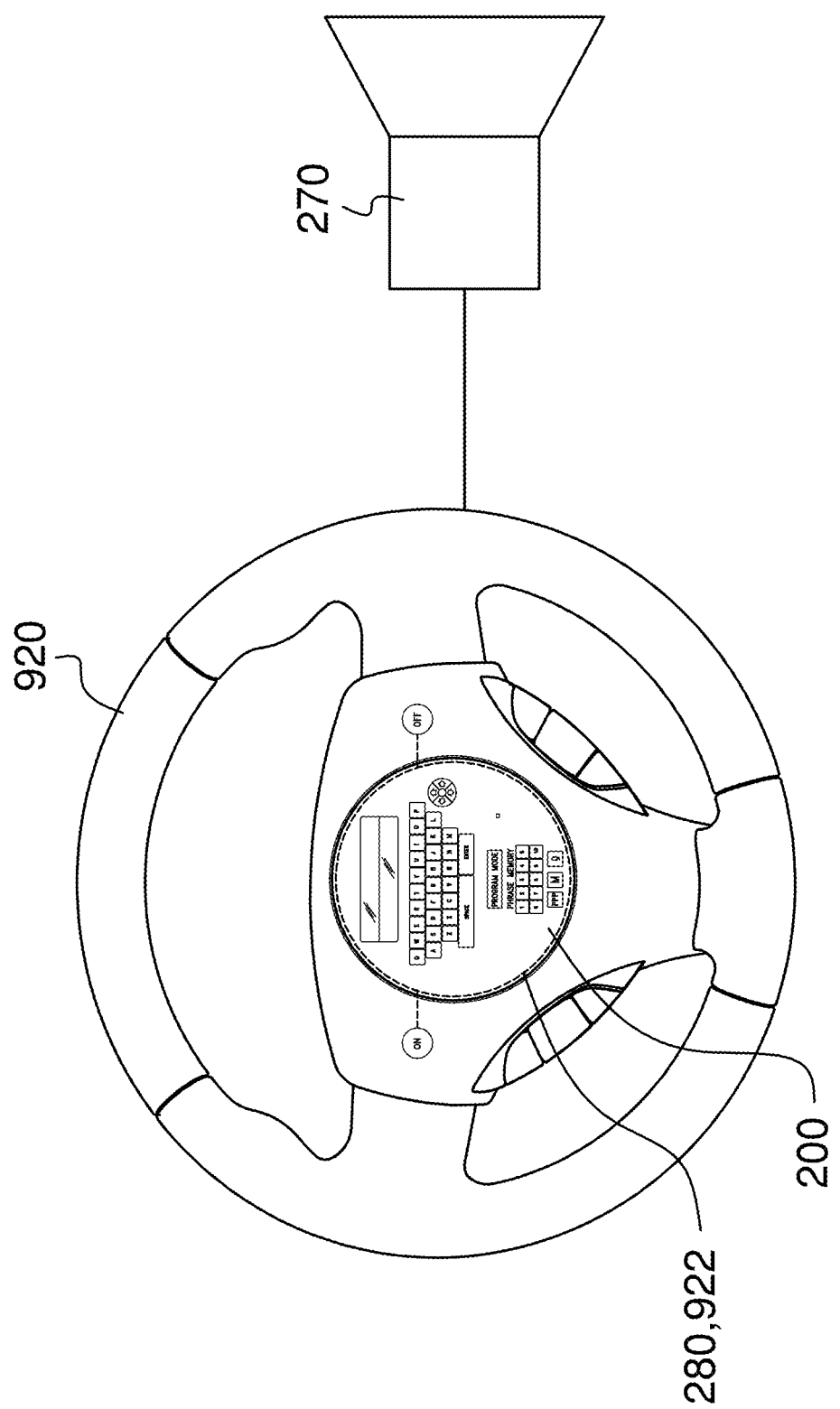
FIG. 5 is a front view of an embodiment of the disclosure, illustrating a new vehicle built-in embodiment.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 7.

The customizable external vehicle communication system 100 (hereinafter invention) comprises an electronics module 200, a sound transducer 270, and a playback activation control 280. Responsive to depressing the playback activation control 280 located within a vehicle 900, the invention 100 may communicate an audible message to pedestrians and/or motorists who may be in proximity to the vehicle 900. The audible message may be delivered external to the vehicle 900 via the sound transducer 270. The audible message may be customized and may result from the conversion of a digital message 284 from text to speech. The digital message 284 may be one of several messages stored in one or more memory modules 206 within the electronics module 200. The digital messages 284 may be created by typing the digital message 284 into the invention 100 or by converting a user's speech from speech to text. As non-limiting examples, the audible message may say "thank you", "you go first", "go ahead and cross the street", "I'm so sorry", or "I'm turning".

The electronics module 200 may comprise a speech to text converter 204, the one or more memory modules 206, a text to speech converter 208, a microcontroller 210, a plurality of operator controls 220, and one or more optical displays 260. The electronics module 200 may be operable to convert the user's speech into the digital message 284 and store the digital message 284 in the one or more memory modules 206, accept the digital message 284 from a keyboard 224 and store the digital message 284 in the one or more memory modules 206, and recall the digital message 284 from the one or more memory modules 206 and convert the digital message 284 to the audible message.

The speech to text converter 204 may receive an input analog signal from a microphone 202 and may convert the input analog signal into the digital message 284. The speech to text converter 204 may pass the digital message 284 to the microcontroller 210. The microcontroller 210 may store the digital message 284 in the one or more memory modules 206.

The microcontroller 210 may recall the digital message 284 from the one or more memory modules 206 and may pass the digital message 284 to the text to speech converter 208. The text to speech converter 208 may convert the digital message 284 into an output analog signal. The output analog signal may be passed to the sound transducer 270 which may convert the output analog signal into the audible message that may be heard coming from the sound transducer 270.

The microcontroller 210 may comprise a computer processor that may incorporate the functions of a central processing unit in the form of one or more integrated circuits. The microcontroller 210 may execute instruction of a control program that may be stored in the one or more memory modules 206. The microcontroller 210 may read and write the one or more memory modules 206 in order to retrieve instructions to execute and to manipulate stored data such as the digital messages 284. The microcontroller 210 may read data from input ports and write data to output ports in order to interact with peripherals such as the speech to text converter 204, the text to speech converter 208, the plurality of operator controls 220, and the one or more optical displays 260.

The plurality of operator controls 220 may be adapted to be actuated by a user 950 to control the operation of the invention 100. The plurality of operator controls 220 may comprise one or more ON/OFF controls 222 and the keyboard 224. The one or more ON/OFF controls 222 may be operable to apply and/or remove power to the electronics module 200. The keyboard 224 may be adapted to accept typed messages from the user 950.

The plurality of operator controls 220 may comprise one or more navigation buttons 230. The one or more navigation buttons 230 may be operable to navigate menus presented by the electronics module 200 and to make selections from the menus. The one or more navigation buttons 230 may comprise an up arrow for navigating up through a menu, a down arrow for navigating down through a menu, a left arrow for navigating left through a menu, a right arrow for navigating right through a menu, an enter button to make a selection from a menu, or any combination thereof. In some embodiments, the one or more navigation buttons 230 may be consolidated into a single combination switch.

The plurality of operator controls 220 may comprise one or more voice controls 250. The one or more voice controls 250 may be operable to control the recording and playback of the audible messages. The one or more voice controls 250 may comprise a microphone activation control 252, one or more message store controls 254, one or more message recall controls 256, or any combination thereof.

The microphone activation control 252 may be operable to active the microphone 202 and the speech to text converter 204 such that the user's speech spoken in front of the microphone 202 is converted to a digital message 284. The one or more message store controls 254 may be operable to select a storage location within the one or more memory modules 206 where the digital message 284 may be stored. The one or more message recall controls 256 may be operable to select a storage location within the one or more memory modules 206 from which the digital message 284 may be recalled for playback. In some embodiments, the one or more message store controls 254 and/or the one or more message recall controls 256 may be used in conjunction with a numeric keypad 244.

The plurality of operator controls 220 may comprise the one or more optical displays 260. The one or more optical displays 260 may be operable to display operational menus, status information, the digital messages 284, or any combination thereof. The one or more optical displays 260 may comprise an input message display 262, an output message display 264, one or more status indicators 266, or any combination thereof.

The input message display 262 may be operable to display the digital message 284 that was most recently converted by the speech to text converter 204. The output message display 264 may be operable to display the digital message 284 currently selected for playback via the text to speech converter 208 and the sound transducer 270. The one or more status indicators 266 may comprise a microphone active indicator 268 that may display an indication that the microphone 202 is recording, may indicate that the one or more memory modules 206 are selected for storing the digital message 284, may indicate that the one or more memory modules 206 are selected for recalling the digital message 284, or any combination thereof.

The sound transducer 270 may convert the output analog signal into audible sound. As a non-limiting example, the sound transducer 270 may be a loudspeaker that may be mounted externally, such as under the hood of the vehicle 900. Alternatively, the sound transducer 270 may be a car horn.

The playback activation control 280 may initiate the microcontroller 210 to pass the digital message 284 to the text to speech converter 208 where the digital message 284 may be converted into the output analog signal that is sent to the sound transducer 270 to produce the audible message. As a non-limiting example, the playback activation control 280 may be a horn button 922 on a steering wheel 920.

In some embodiments, selection of the digital messages 284 for playback may be performed verbally. Each of the digital messages 284 may comprise a playback tag assigned at the time that the digital message 284 was recorded. As a non-limiting example, the playback tag for the digital message 284 "I'm so sorry" may be "SORRY". The microcontroller 210 may be adapted to listen, via the microphone 202 and the speech to text converter 204, for selection of the digital message 284 using the playback tag. The microcontroller 210 may be adapted to select the digital message 284 from the one or more memory modules 206 upon hearing the playback tag that matches the digital message 284 spoken by the user 950. The microcontroller 210 may then play back the selected message when the playback activation control 280 is pressed.

Alternatively, instead of using the playback tag to look up the digital message 284, the microcontroller 210 may pass the digital message 284 converted directly from the user's speech to the text to speech converter 208.

Figure 6:
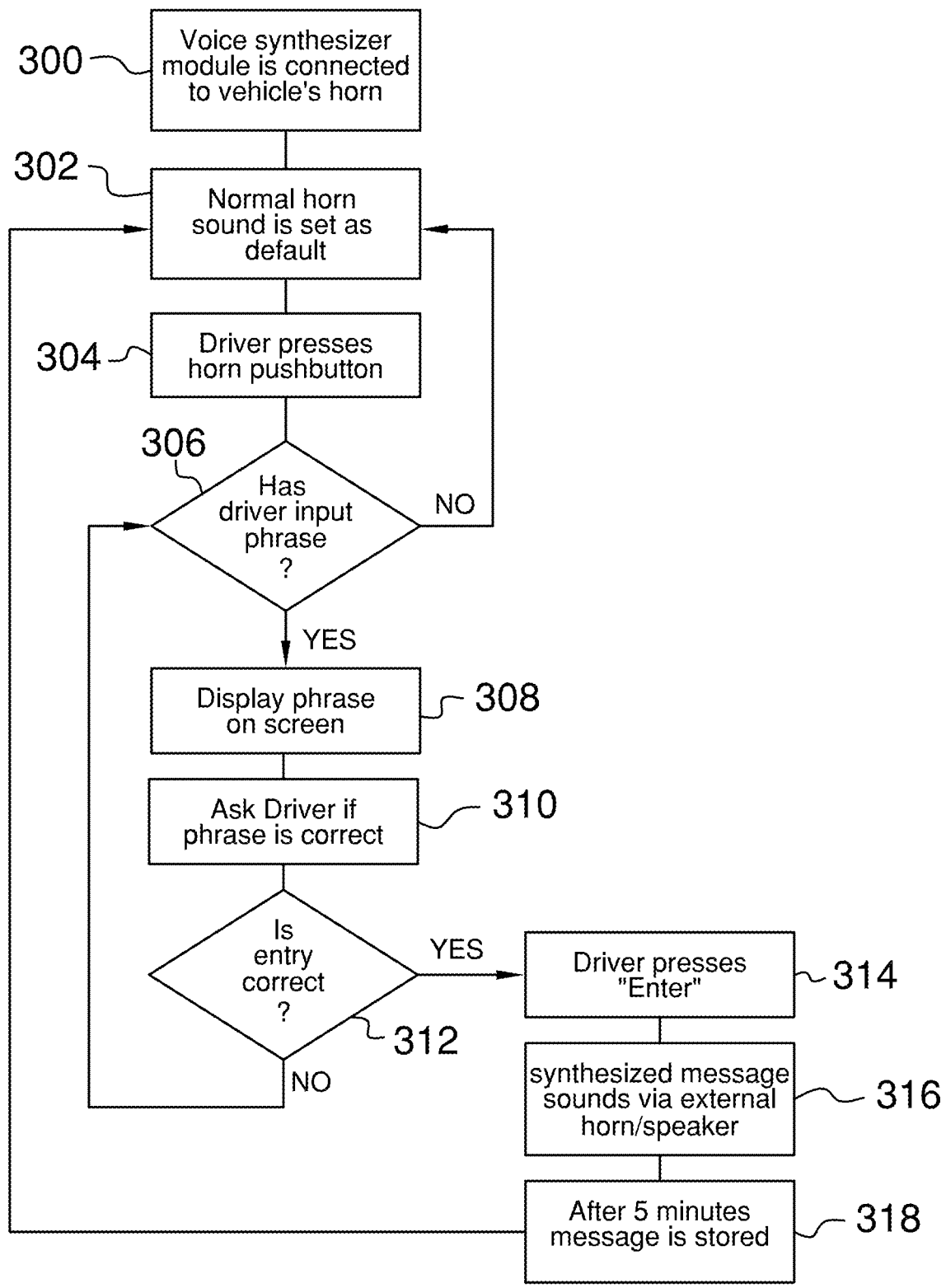
FIG. 6 is a block diagram of an embodiment of the disclosure.
Figure 7:
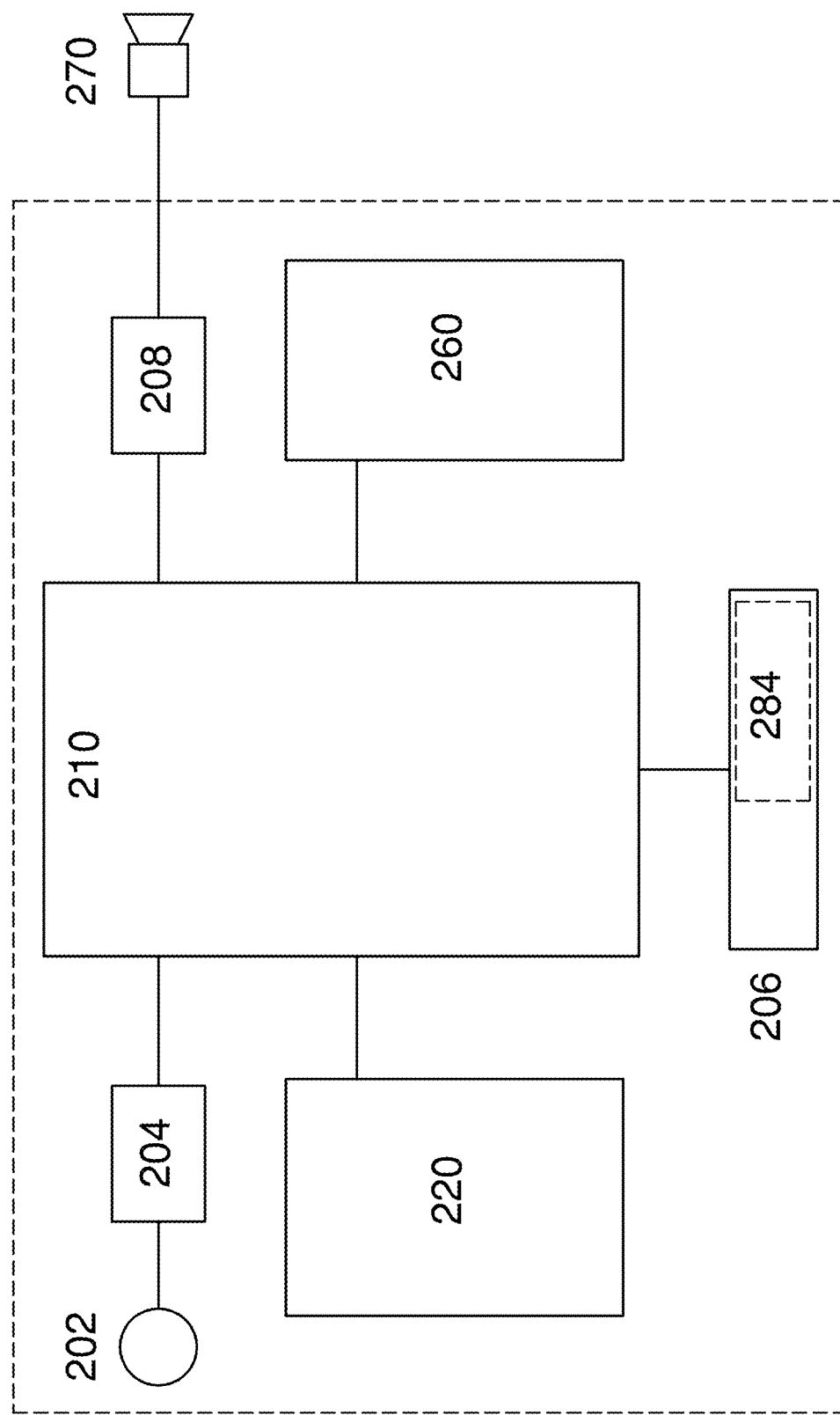
FIG. 7 is a detail view of an embodiment of the disclosure, illustrating the electronics module.

FIG. 6 illustrates an embodiment of the invention 100. The invention 100 is installed within the vehicle 900 and electrically coupled to the sound transducer 270 at block 300. At block 302, a default sound is set. At block 304, the user 950 may press the playback activation control 280. At block 306, a check is performed to determine whether the user 950 has spoken prior to depressing the playback activation control 280. If the user 950 has not spoken, the sound transducer 270 produces a horn sound and control returns to block 302. If the user 950 has spoken prior to depressing the playback activation control 280, control passes to block 308. At block 308, the digital message 284 is displayed on the plurality of operator controls 220. The digital message 284 may either be the digital message 284 of the user's speech or a lookup of the digital message 284 based upon the playback tag spoken by the user 950. At block 310, the user 950 is requested to confirm that the digital message 284 was converted correctly. At block 312, the user 950 response to the confirmation request is checked. If the user 950 indicates that the digital message 284 is incorrect then control returns to block 306. If the digital message 284 was selected correctly, then control waits for the user 950 to acknowledge the message selection in block 314. At block 316, the digital message 284 is passed to the text to speech converter 208 and play backed via the sound transducer 270. In some embodiments, the digital message 284 may be stored in the one or more memory modules 206 for reuse after a pre-programmed timeout ay block 318.

In some embodiments, the electronics module 200 may be housed in a module housing 258 that may be mounted within the vehicle 900, such as on a dashboard or a center console. Alternatively, the electronics module 200 may be housed within the steering wheel 920

In use, the user 950 may record one or more digital messages 284 by typing the digital messages 284 into the keyboard 224 and/or by recording the user's speech vias the microphone 202 and the speech to text converter 204. The digital messages 284 may be stored in the one or more memory modules 206 for later use. To play the digital message 284 via the sound transducer 270, the user 950 may select the digital message 284 from the one or more memory modules 206 and depress the playback activation control 280. Responsive to depressing the playback activation control 280, the microcontroller 210 may send the digital message 284 from the one or more memory modules 206 to the text to speech converter 208 to produce the output analog signal. The output analog signal may be passed to the sound transducer 270 which may produce the audible message.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "housing" may be a rigid or semi-rigid casing that encloses and protects one or more devices.

As used in this disclosure, a "microcontroller" may be a small computer, often on a single integrated circuit, containing a processor core, memory, and programmable input/output peripherals.

As used in this disclosure, a "microphone" may be a transducer that converts the energy from vibration into electrical energy. The sources of vibrations include, but are not limited to, acoustic energy.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "speaker" may be an electrical transducer that converts an electrical signal into an audible sound, A speaker may also be referred to as a loudspeaker.

As used in this disclosure, a "transducer" may be a device that converts a physical quantity, such as pressure or brightness, into an electrical signal or a device that converts an electrical signal into a physical quantity.

As used herein, "vehicle" may refer to a device that is used for transporting passengers, goods, equipment, or combinations thereof.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A customizable external vehicle communication system comprising:
    an electronics module, a sound transducer, and a playback activation control;
    wherein responsive to depressing the playback activation control located within a vehicle, the customizable external vehicle communication system communicates an audible message to pedestrians and/or motorists who are in proximity to the vehicle;
    wherein the audible message is delivered external to the vehicle via the sound transducer;
    wherein the audible message is customized and results from a conversion of a digital message from text to speech;
    wherein the digital message is one of several messages stored in one or more memory modules within the electronics module;
    wherein the digital messages are created by typing the digital message into the customizable external vehicle communication system or by converting a user's speech from speech to text;
    wherein a plurality of operator controls are adapted to be actuated by a user to control the operation of the customizable external vehicle communication system;
    wherein the plurality of operator controls comprise one or more ON/OFF controls and a keyboard;
    wherein the one or more ON/OFF controls are operable to apply and/or remove power to the electronics module;
    wherein the keyboard is adapted to accept typed messages from the user.

2. The customizable external vehicle communication system according to claim 1
    wherein the electronics module comprises a speech to text converter, the one or more memory modules, a text to speech converter, a microcontroller, the plurality of operator controls, and one or more optical displays;
    wherein the electronics module is operable to convert the user's speech into the digital message and store the digital message in the one or more memory modules, accept the digital message from the keyboard and store the digital message in the one or more memory modules, and recall the digital message from the one or more memory modules and convert the digital message to the audible message.

3. The customizable external vehicle communication system according to claim 2
    wherein the speech to text converter receives an input analog signal from a microphone and converts the input analog signal into the digital message;
    wherein the speech to text converter passes the digital message to the microcontroller;
    wherein the microcontroller stores the digital message in the one or more memory modules.

4. The customizable external vehicle communication system according to claim 3
    wherein the microcontroller recalls the digital message from the one or more memory modules and passes the digital message to the text to speech converter;
    wherein the text to speech converter converts the digital message into an output analog signal;
    wherein the output analog signal is passed to the sound transducer which converts the output analog signal into the audible message that is heard coming from the sound transducer.

5. The customizable external vehicle communication system according to claim 4
    wherein the microcontroller comprises a computer processor that incorporates the functions of a central processing unit in the form of one or more integrated circuits;
    wherein the microcontroller executes instruction of a control program that is stored in the one or more memory modules;
    wherein the microcontroller reads and writes the one or more memory modules in order to retrieve instructions to execute and to manipulate stored data such as the digital messages;
    wherein the microcontroller reads input data from input ports and writes output data to output ports in order to interact with peripherals such as the speech to text converter, the text to speech converter, the plurality of operator controls, and the one or more optical displays.

6. The customizable external vehicle communication system according to claim 5
    wherein the plurality of operator controls comprise one or more navigation buttons;
    wherein the one or more navigation buttons are operable to navigate menus presented by the electronics module and to make selections from the menus;
    wherein the one or more navigation buttons comprise an up arrow for navigating up through a menu, a down arrow for navigating down through a menu, a left arrow for navigating left through a menu, a right arrow for navigating right through a menu, an enter button to make a selection from a menu, or any combination thereof.

7. The customizable external vehicle communication system according to claim 6
    wherein the one or more navigation buttons are consolidated into a single combination switch.

8. The customizable external vehicle communication system according to claim 6
    wherein the plurality of operator controls comprise one or more voice controls;
    wherein the one or more voice controls are operable to control the recording and playback of the audible messages;
    wherein the one or more voice controls comprise a microphone activation control, one or more message store controls, one or more message recall controls, or any combination thereof.

9. The customizable external vehicle communication system according to claim 8
    wherein the microphone activation control is operable to active the microphone and the speech to text converter such that the user's speech spoken in front of the microphone is converted to the digital message;

wherein the one or more message store controls are operable to select a storage location within the one or more memory modules where the digital message is stored;

wherein the one or more message recall controls are operable to select a storage location within the one or more memory modules from which the digital message is recalled for playback.

10. The customizable external vehicle communication system according to claim 9 wherein the one or more message store controls and/or the one or more message recall controls are used in conjunction with a numeric keypad.

11. The customizable external vehicle communication system according to claim 9 wherein the plurality of operator controls comprise the one or more optical displays;

wherein the one or more optical displays are operable to display operational menus, status information, the digital messages, or any combination thereof;

wherein the one or more optical displays comprise an input message display, an output message display, one or more status indicators, or any combination thereof.

12. The customizable external vehicle communication system according to claim 11 wherein the input message display is operable to display the digital message that was most recently converted by the speech to text converter;

wherein the output message display is operable to display the digital message currently selected for playback via the text to speech converter and the sound transducer;

wherein the one or more status indicators comprise a microphone active indicator that displays an indication that the microphone is recording, indicates that the one or more memory modules are selected for storing the digital message, indicates that the one or more memory modules are selected for recalling the digital message, or any combination thereof.

13. The customizable external vehicle communication system according to claim 12 wherein the sound transducer converts the output analog signal into audible sound.

14. The customizable external vehicle communication system according to claim 13 wherein the playback activation control initiates the microcontroller to pass the digital message to the text to speech converter where the digital message is converted into the output analog signal that is sent to the sound transducer to produce the audible message.

15. The customizable external vehicle communication system according to claim 14 wherein the playback activation control is a horn button on a steering wheel.

16. The customizable external vehicle communication system according to claim 14 wherein selection of the digital messages for playback are performed verbally;

wherein each of the digital messages comprises a playback tag assigned at the time that the digital message was recorded;

wherein the microcontroller is adapted to listen, via the microphone and the speech to text converter, for selection of the digital message using the playback tag;

wherein the microcontroller is adapted to select the digital message from the one or more memory modules upon hearing the playback tag that matches the digital message spoken by the user;

wherein the microcontroller plays back the selected message when the playback activation control is pressed.

17. The customizable external vehicle communication system according to claim 14 wherein the electronics module is housed in a module housing that is mounted within the vehicle.

18. The customizable external vehicle communication system according to claim 14 wherein the electronics module is housed within the steering wheel.

* * * * *